June 22, 1954            S. FOX            2,681,504
COMBINATION FLOWER STEM STRIPPER AND CUTTER
Filed June 16, 1953
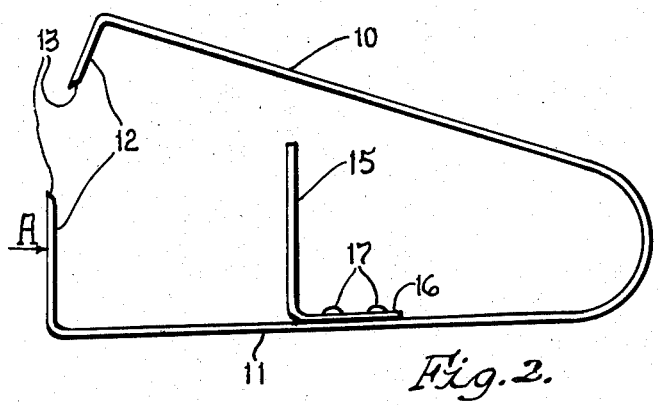
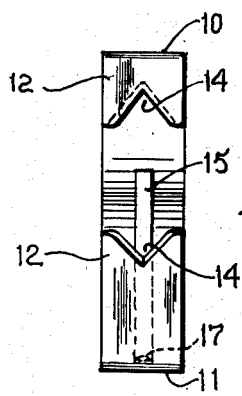
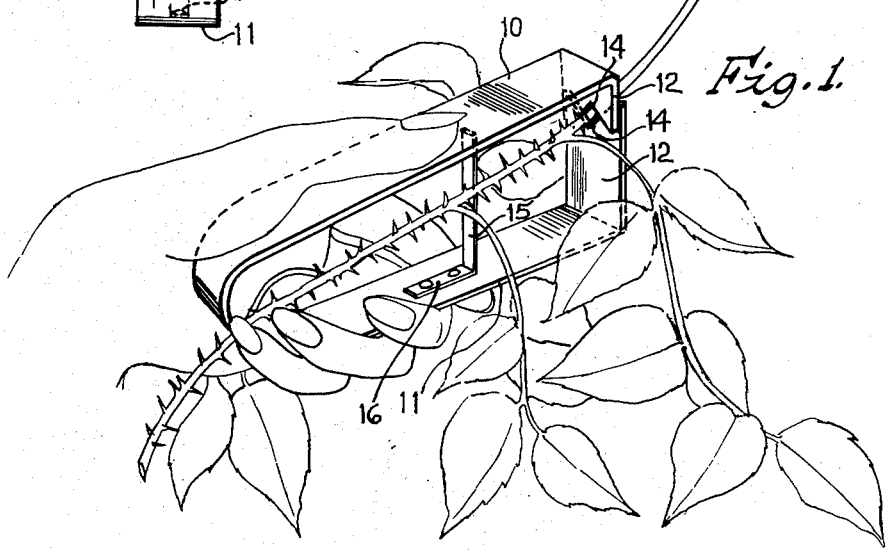
INVENTOR.
BY SOL FOX
HIS ATTORNEY.

Patented June 22, 1954

2,681,504

UNITED STATES PATENT OFFICE 2,681,504

COMBINATION FLOWER STEM STRIPPER AND CUTTER

Sol Fox, Chicago, Ill., assignor to Koppoware Products Mfg. Co., Chicago, Ill., a copartnership Application June 16, 1953, Serial No. 361,911

2 Claims. (Cl. 30—123)

This invention relates to certain new and useful improvements in a combination flower stem stripper and cutter especially designed for use by florists and gardeners to strip leaves, thorns and short branches from the stems of flowers or branches, such, for example, as roses or the like.

An object of the invention is to provide a tool of this character which will be simple in construction, easy of manipulation, and economical in manufacture.

Another and important object of the invention is to provide in a tool of this character a stop or limiting arm which is so located with respect to the stripper jaws of the tool as to limit the relative position of the jaws during the stripping action, while serving as a fulcrum for the arms during the cutting operation on the stem after the stripping operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the invention showing the same in stripping relation with respect to a flower stem;

Fig. 2 is a side elevational view of the invention;

Fig. 3 is an end view as at A.

The invention in its preferred form of construction preferably comprises an elongated strip of spring material formed substantially U-shaped to provide oppositely normally yieldably disposed apart gripping arms 10 and 11. These arms 10 and 11 at their free ends terminate into stripping and cutting jaws 12 extending substantially at right angles with respect to the arms 10 and 11. The meeting edges 13 of these jaws 12 are preferably beveled on their inner surfaces whereby when such edges are brought together, the jaws 12 will be deflected slightly laterally with respect to each other for movement into overlapping position as shown in Fig. 1. These jaws 12 each provide V-shaped stripping and cutting notches 14 preferably ground to a knife edge for stripping and cutting purposes.

On the gripping arm 11 substantially midway between the bight portion of the tool and the jaw 12 of the arm 11, is arranged a substantially rigid stop or limiting finger 15 having a rectangularly disposed foot 16 secured to the jaw 11 as at 17.

The tool is preferably held in the hand as depicted in Fig. 1. In this position, it will be seen that the thumb of the hand lies substantially midway between the jaw of the gripping arm 10 and at the point where the stop finger 15 will engage such gripping arm 10. It will also be observed that the third and index fingers of the hand are located between the stop finger 15 and the jaw 12 of the gripping arm 11. When the tool is held in this position, the arms 10 and 11 yieldably pressed toward each other a sufficient distance to move the jaws 12 into stripping engagement with the stem 18 of a flower 19. In such position the stop finger 15 is in engagement with the arm 10. By holding the tool in this position, with the jaws embracing the stem 18, and moving the tool longitudinally of such stem, the thorns, leaves and short branches may be readily stripped therefrom. After a predetermined length of stem has been thus stripped, the operator may then exert a greater degree of pressure upon the arms 10 and 11 so as to further press the arms toward each other into cutting action upon the stem 18, thereby to sever the unstripped stem from the stripped portion of the stem of the flower. In further pressing the arms 10 and 11 toward each other for the cutting operation upon the stem 18, the arm 10 utilizes as its fulcrum the stop finger 15.

By constructing a tool in the manner above described, I have provided in a single unitary tool a combination stem stripper and cutter which will be highly efficient in use and especially desirable for florists and gardeners; a tool which may in its first operation be used for stripping the stem of the flower and then, if desired, cutting the stem at the completion of the stripping operation without first releasing the tool from the stem. The use of my tool requires the minimum degree of effort, thus resulting in a saving of time and labor.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A combination flower stem stripper and cutter comprising an elongated strip of spring material bent substantially U-shaped to provide opposite normally yieldably held apart gripping arms, cooperating jaw elements at the free ends of said arms and extending substantially at right angles with respect to said arms, said jaw elements having V-shaped stripping and cutting notches formed therein with the edges of said notches providing cutting blades, and a rigid stop finger carried by one of said arms and extending at right angles with respect to said one arm in the path of movement of the other of said arms toward said one arm, said stop finger limiting the movement of said arms toward each other to position the jaw elements into stripping engagement with a flower stem and said stop finger providing a fulcrum for said other arm when said other arm is manually pressed toward said one arm to effect cutting operation of said stem by said jaw elements.

2. A combination flower stem stripper and cutter comprising an elongated strip of spring material bent substantially U-shaped to provide opposite normally yieldably held apart gripping arms, cooperating jaw elements at the free ends of said arms and extending substantially at right angles with respect to said arms, said jaw elements having V-shaped stripping and cutting notches formed therein with the edges of said notches providing cutting blades, and a rigid stop finger carried by one of said arms and extending at right angles with respect to said one arm in the path of movement of the other of said arms toward said one arm, said stop finger limiting the movement of said arms toward each other to position the jaw elements into stripping engagement with a flower stem and said stop finger providing a fulcrum for said other arm when said other arm is manually pressed toward said one arm to effect cutting operation of said stem by said jaw elements, the edges of said jaw elements on their inner sides being beveled to deflect said jaw elements laterally for overlapping relation when brought into engagement with respect to each other.

References Cited in the file of this patent

UNITED STATES PATENTS

| Number | Name | Date |
| --- | --- | --- |
| Re. 14,169 | Aaron | July 25, 1916 |
| 845,881 | Moncus | Mar. 5, 1907 |
| 1,065,679 | Gregson | June 24, 1913 |
| 1,685,977 | Bollerman | Oct. 2, 1928 |
| 2,167,337 | De Meester | July 25, 1939 |
| 2,232,315 | Craig | Feb. 18, 1941 |
| 2,451,463 | Zimmermann | Oct. 19, 1948 |
| 2,533,657 | Wolfe | Dec. 12, 1950 |